(12) United States Patent
Dressen et al.

(10) Patent No.: US 7,240,848 B1
(45) Date of Patent: Jul. 10, 2007

(54) THREE PORT RF INTERFACE CHIP

(75) Inventors: David W. Dressen, Pueblo West, CO (US); Mathew T. Wich, Colorado Springs, CO (US)

(73) Assignee: Atmel Corporation, San Jose, CA (US)

( * ) Notice: Subject to any disclaimer, the term of this patent is extended or adjusted under 35 U.S.C. 154(b) by 0 days.

(21) Appl. No.: 11/470,561

(22) Filed: Sep. 6, 2006

(51) Int. Cl.
*G06K 19/06* (2006.01)

(52) U.S. Cl. .................. 235/492; 235/472.02

(58) Field of Classification Search .......... 235/487, 235/492, 462.46, 472.02; 710/107, 110; 340/10.1, 10.4
See application file for complete search history.

(56) References Cited

U.S. PATENT DOCUMENTS

| | | | |
|---|---|---|---|
| 6,046,676 A * | 4/2000 | Ward et al. | 340/572.1 |
| 6,294,997 B1 | 9/2001 | Paratore et al. | |
| 6,466,007 B1 * | 10/2002 | Prazeres da Costa et al. | 324/158.1 |
| 6,480,101 B1 * | 11/2002 | Kelly et al. | 340/10.2 |
| 6,505,095 B1 * | 1/2003 | Kolls | 700/244 |
| 6,570,490 B1 | 5/2003 | Saitoh et al. | |
| 6,827,265 B2 * | 12/2004 | Knowles et al. | 235/462.01 |
| 2005/0239503 A1 | 10/2005 | Dressen et al. | |

OTHER PUBLICATIONS

Atmel Corporation, "RFID External EEPROM Interface IC," Datasheet AT88RF001, Rev. 1943F, Apr. 2002.

* cited by examiner

*Primary Examiner*—Daniel St.Cyr
(74) *Attorney, Agent, or Firm*—Schneck & Schneck; Thomas Schneck

(57) ABSTRACT

An RFID interface integrated-circuit chip has three ports including a bi-directional RF port, a serial or parallel data external memory IC port, and a serial or parallel data external electronic system port. DC power is supplied to a separate external memory IC chip through the serial external memory port either from power obtained from an RF signal through the bi-directional RF port, from DC power provided from an external electronic system, or from an auxiliary voltage source, such as a battery or fuel cell that replaces power provided from the RF signal. Data and control signals are interchanged with the separate external memory IC chip through the serial or parallel external-memory port using the RF port when the external electronic system is not available or through the external electronic system serial or parallel port when the external electronic system is available.

28 Claims, 8 Drawing Sheets

THREE PORT RF INTERFACE CHIP

TECHNICAL FIELD

The present invention relates to a radio frequency identification device (RFID) interface chip and, more particularly, to an RF interface chip that has three external ports.

BACKGROUND ART

An RFID tag is a radio-frequency transponder that receive RF power at a given frequency and converts that received RF power to DC power to power itself and to transmit an RF signal. U.S. Pat. No. 6,046,676 discloses a RFID tag that is used for identifying and for communicating with a computer. The RFID tag is self-powered from a so-called RF interrogation signal when the electronic device is not operational. The RFID tag is powered from the computer when it is communicating with the computer. The RFID tag is attached to the computer as part of the computer memory. This arrangement limits the size of the memory to that provided within the RFID tag.

A previously known two-port RFID device is the AT88RF001 by Atmel Corporation, San Jose, Calif. that is a stand-alone 13.56 MHz two-port RFID front-end device that has one RF antenna port and one serial memory port for connection to an external serial memory chip. This RFID device does not have provisions for interfacing with an external computer system. This RFID device provides power to the external serial memory chip. A problem with integrating this type of RFID device into an electronic system is that the external serial memory resides on a system bus with other devices. When an attempt is made to power the external serial memory via RF energy received via the RF antenna port, other devices on the system bus draw current from the RFID device because of I/O circuit leakages, shared power connections with memory devices, etc. These various current drains or leakage paths are not easily quantified or controlled.

What is desired is an RFID device that is isolated from the rest of an electronic system, to thereby eliminate leakage paths to other elements of the system. As a result, the amount of power to be supplied by the RFID device is only power that is consumed by the RFID device itself and the power required by the external memory.

SUMMARY OF THE INVENTION

An RFID interface integrated-circuit chip according to the present invention has three ports including a bi-directional RF port, an external memory port, and an external electronic system port. DC power is supplied to a separate external memory chip through the external memory port either from power obtained from an RF signal through the bi-directional RF port or from DC power provided from an external electronic system. An auxiliary voltage source replaces the power obtained from the RF signal. This arrangement also allows data and control signals to be interchanged with the separate external memory chip through the serial external-memory port using the RF port when the external electronic system is not available or through the external electronic system port when the external electronic system is available.

A three-port RFID interface integrated-circuit chip includes a bi-directional RF first port that is adapted to be coupled to an external source of RF energy. An analog front end (AFE) circuit is coupled to the bi-directional RF first input port. The AFE circuit provides an AFE power supply DC output voltage from a RF signal received from the external source of RF energy. The AFE circuit is coupled to a bi-directional AFE serial interface bus on which are exchanged serial data I/O signals and status/control signals.

An external memory second port is provided through which an external memory integrated circuit is coupled to an interface circuit module. The interface circuit module receives the AFE power supply DC output voltage from the AFE circuit and the interface circuit module provides, through the external memory second port, an external memory integrated circuit power supply voltage to the external memory integrated circuit. The interface circuit module is connected to the AFE serial interface bus and to the external memory IC through a bi-directional memory integrated circuit serial interface bus on which are exchanged serial data I/O signals and status/control signals.

A third external electronic system port is provided through which an external electronic system is coupled to the interface circuit module. The external electronic system provides an external system power supply voltage to the interface circuit module. The external electronic system is coupled to the interface circuit module through a bi-directional external electronic system serial interface bus on which are exchanged serial data I/O signals and status/control signals.

The interface circuit module includes a power sense circuit that has a first input terminal for receiving the AFE power supply DC voltage from the AFE circuit, that has a second input terminal connected to the external electronic system power supply voltage, and that has a power sense control signal output terminal at which is provided a power sense control output signal. The power sense control signal output signal has one state which indicates when the external electronic system power supply voltage is present and has another alternative state that indicates when the AFE power supply DC voltage is present. The power sense control circuit senses which power source (AFE or external system) appears first (in time) and outputs the corresponding control signal. The power control signal state is latched until the power source is removed. A power control circuit responsive to the alternative states of the power sense control signal respectively provides the AFE power supply DC voltage or the external electronic system power supply voltage as the external memory IC power supply voltage to the external memory IC.

The power control circuit includes an AFE power switch that is controlled by the power sense control signal to provide through the external memory second port, an external memory integrated circuit power supply voltage to the external memory integrated circuit. The power control circuit also includes an external electronic system power switch that is controlled by the power sense control signal to alternatively provide through the external memory second port an external memory integrated circuit power supply voltage to the external memory integrated circuit.

A power sense circuit has: a first input terminal for receiving the AFE power supply DC voltage from the AFE circuit, a second input terminal connected to the external electronic system power supply voltage, and a power sense control signal output terminal at which is provided a power sense control output signal that has one state which indicates when the external electronic system power supply voltage is present and that has another alternative state that indicates when the AFE power supply DC voltage is present.

A serial data interface control circuit is provided that is responsive to the alternative states of the power sense circuit for respectively providing connection between the AFE serial interface bus and the memory serial interface IC bus and between electronic system serial interface bus and the memory serial interface bus.

The serial data interface control circuit has an AFE serial data interface switch that is controlled by the power sense control signal to provide connection between the AFE serial interface bus and the memory serial interface bus. The serial data interface control circuit has an external electronic system switch that is controlled by the power sense control signal to alternatively provide connection between the electronic system serial interface bus and the memory serial interface bus.

A method of interfacing three ports through a three-port RFID chip is provided comprising the steps of: coupling a bi-directional RF first port to an external source of RF energy; coupling an analog front end (AFE) to the bi-directional RF first input port; receiving a RF signal from the external source of RF energy and providing with the AFE circuit an AFE power supply DC output voltage; coupling the AFE circuit to a bi-directional AFE serial interface bus on which are exchanged serial data I/O signals and status/control signals; coupling through an external memory second port an external memory integrated circuit that is coupled to an interface circuit module; receiving with the interface circuit module the AFE power supply DC output voltage from the AFE circuit; providing with the interface circuit module and through the external memory second port to the external memory integrated circuit an external memory integrated circuit power supply voltage; connecting the interface circuit module to the AFE serial interface bus; coupling the interface circuit module to the external memory IC through a bi-directional memory integrated circuit serial interface bus on which are exchanged serial data I/O signals and status/control signals; coupling through a third external electronic system port to the interface circuit module an external electronic system; providing with the external electronic system an external system power supply voltage to the interface circuit module; and coupling the external electronic system to the interface circuit module through a bi-directional external electronic system serial interface bus on which are exchanged serial data I/O signals and status/control signals.

The method includes: receiving at a first input terminal of a power sense circuit in the interface circuit the AFE power supply DC voltage from the AFE circuit; connecting a second input terminal of the power sense circuit in the interface circuit the external electronic system power supply voltage; providing at a power control signal input terminal a power sense circuit output signal that has one state which indicates when the external electronic system power supply voltage is present and that has another alternative state that indicates when the AFE power supply DC voltage is present; and respectively providing, with a power control circuit responsive to the alternative states of the power sense control signal, the AFE power supply DC voltage or the external electronic system power supply voltage as the external memory IC power supply voltage to the external memory IC.

The method also includes: controlling an AFE power switch in the power control circuit with the power sense control signal and providing through the external memory second port an external memory integrated circuit power supply voltage to the external memory integrated circuit; and controlling an external electronic system power switch in the power control circuit with the power sense control signal for alternatively providing through the external memory second port an external memory integrated circuit power supply voltage to the external memory integrated circuit.

The method also includes: receiving at a first input terminal of a power sense circuit in the interface circuit the AFE power supply DC voltage from the AFE circuit; connecting a second input terminal of the power sense circuit in the interface circuit the external electronic system power supply voltage; providing at a power sense control signal input terminal a power sense control output signal that has one state which indicates when the external electronic system power supply voltage is present and that has another alternative state that indicates when the AFE power supply DC voltage is present; and respectively providing, with a serial data interface control circuit responsive to the alternative states of the power sense circuit, connection between the memory serial interface bus and the AFE serial bus or the external electronic system serial interface bus.

The method additionally includes: controlling an AFE serial data interface switch in the serial data interface control circuit with the power sense control signal for providing connection between the AFE serial interface bus and the memory serial interface bus; and controlling an external electronic system switch in the serial data interface control circuit for alternatively providing connection between the electronic system serial interface bus and the memory serial interface bus.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

An RFID system includes an RFID transponder that is attached to or closely associated with an electronic device or system, such as a computer. Using RF signals, the RFID transponder and an external reader/interrogator communicate with each other. The RFID transponder and the reader/interrogator are each bidirectional devices that send and receive information from each other. The reader/interrogator also sends back to the transponder an RF signal that is received by the transponder and that is converted to DC power for the transponder. The transponder also communicates with the reader/interrogator with it own transponder RF signals.

A transponder typically includes an integrated circuit for receiving RF power from the reader/interrogator and for converting that RF power to DC power for operating the transponder without a wired power supply or batteries being required. The RFID transponder also includes electronic circuits for transmitting and receiving communication signals. RFID systems are used in several RF frequency bands, including the low-frequency LF band at 125 kHz, the high-frequency HF band at 13.56 MHz, and the UHF band at 865-960 MHz. Depending on its frequency band, a transponder uses various electronic components for transmitting and receiving RF signals including: a coil and a capacitor for a LF transponder, a coil and capacitor for a HF transponder, and an antenna for a UHF transponder.

In order to provide DC power to a transponder for processing reader communications and for transmitting its own transponder RF signal back to the reader, the circuitry of the transponder is passively powered by energy derived from the reader RF signal received by the transponder. The transponder contains, for example, a rectifier circuit that converts received RF power to DC power for operating the transponder. Alternatively, the transponder may be powered by an external electronic device or system, such as a computer, to which the RFID is attached or closely associated with.

The present invention contemplates having an RFID interface integrated circuit chip that has three ports, a bi-directional RF port for receiving and transmitting RF signals to and from a reader/interrogator, an external memory port for connecting to an external independent memory chip, and an external electronic system port for connecting to an external electronic system, such as a computer, or the like. This type of RFID integrated circuit chip does not limit the size of the external memory that can be used and provides for greater flexibility in use and interaction of the RFID interface integrated circuit chip, the external memory, and the external electronic system.

Figure 1:
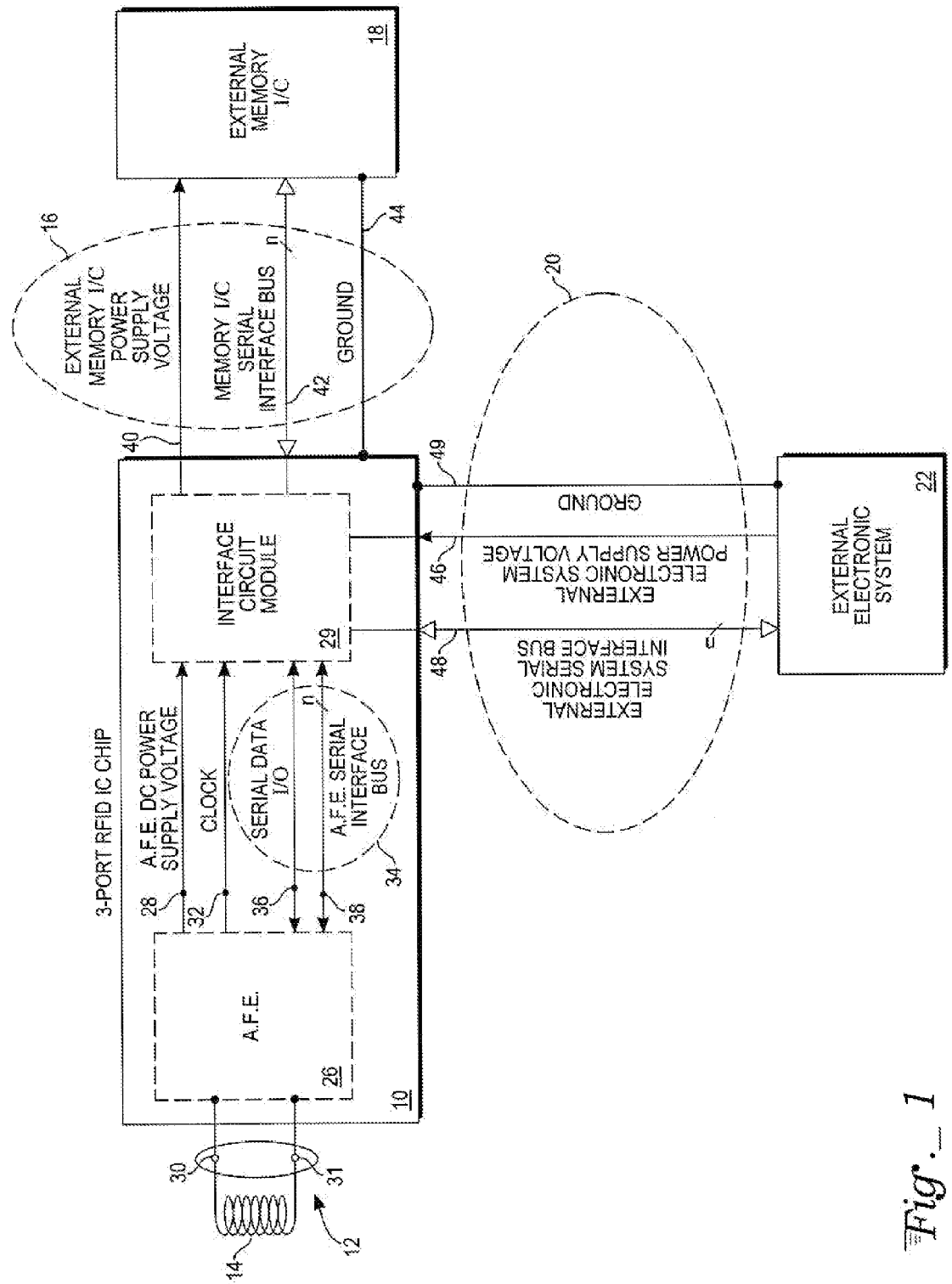
FIG. 1 is a block diagram showing a three-port RFID interface integrated-circuit chip according to the present invention for interfacing: with an RF source through an antenna port, with an external memory IC through an external memory port, and with an external electronic system through an external system port.

FIG. 1 shows one embodiment of a three-port RFID interface integrated-circuit chip 10, according to the present invention. The three-port RFID interface integrated-circuit chip 10 illustrates an interface for three serial data ports. Note that the present invention also functions with parallel data ports and with combinations of serial and parallel ports, as required for particular applications. An antenna port 12 provides an interface with an external RF source (not shown) through an antenna 14. An external memory port 16 provides an interface with an external memory IC 18. An external system port 20 provides an interface with an external electronic system 22. As described herein below, this allows the external memory IC 18 to be used independently with power provided from one of two power sources. One source is an external RF signal received at the antennas port 12, without power from the external electronic system 22. The other source is the external electronic system 22 alone, without an external RF signal being received at the antenna port.

The three-port RFID interface integrated-circuit chip 10 includes an analog front-end A.F.E. circuit 26 and an interface circuit 29. Bi-directional terminals 30, 31 for the analog front-end A.F.E. circuit 26 are connected to the antenna 14 to receive RF energy from an RF signal provided from an external RF source. The RF signal is modulated, for example, with various types of information, including data information, clock information, status information, and control information. Some of this information can be sent to the external memory IC 18 through the external memory port. Various types of information can also be sent to the antenna 14 through the antenna port 12 to the reader/interrogator.

The A.F.E. circuit 26 is provided as known in the art with a rectifier circuit (not shown) that converts received RF energy to a DC output voltage that is provided on a DC power line 28 to an input terminal of the interface circuit module 29. The A.F.E. circuit 26 has a clock recovery circuit that provides a clock signal on a clock line 32 to an input terminal of the interface circuit module 29.

An A.F.E. serial interface bus 34 between the A.F.E. circuit 26 and the interface circuits 29 provides input/output serial data on a serial DATA I/O signal line 36. The A.F.E. serial interface bus 34 also provides a status/control sub-bus 38 having n-lines between the A.F.E. circuit 26 and the interface circuits 29 for carrying status and control signals, as required.

The external memory port 16 provides a memory IC power supply voltage on a DC power line 40 to the external memory IC 18. The external memory port 16 also provides a n-line memory serial interface bus 42 between the interface circuit module 29 and the external memory IC 18. A ground line 44 is also provided between the interface circuit module 29 and the external memory IC 18. The memory serial interface bus 42 carries serial data, status, and control signals between the interface circuit module 29 and the external memory IC 18.

The external electronic system 22 provides an external electronic system power supply voltage on an external-system DC power line 46 of the external system port 20. The external system port 20 also provides a n-line electronic system serial interface bus 48 between the external electronic system 22 and the interface circuit module 29. The n-line electronic system serial interface bus 48 carries serial data, status, and control signals between the interface circuit module 29 and the external electronic system.

A ground line 49 is also provided between the external electronic system and the interface circuit module 29.

Figure 2:
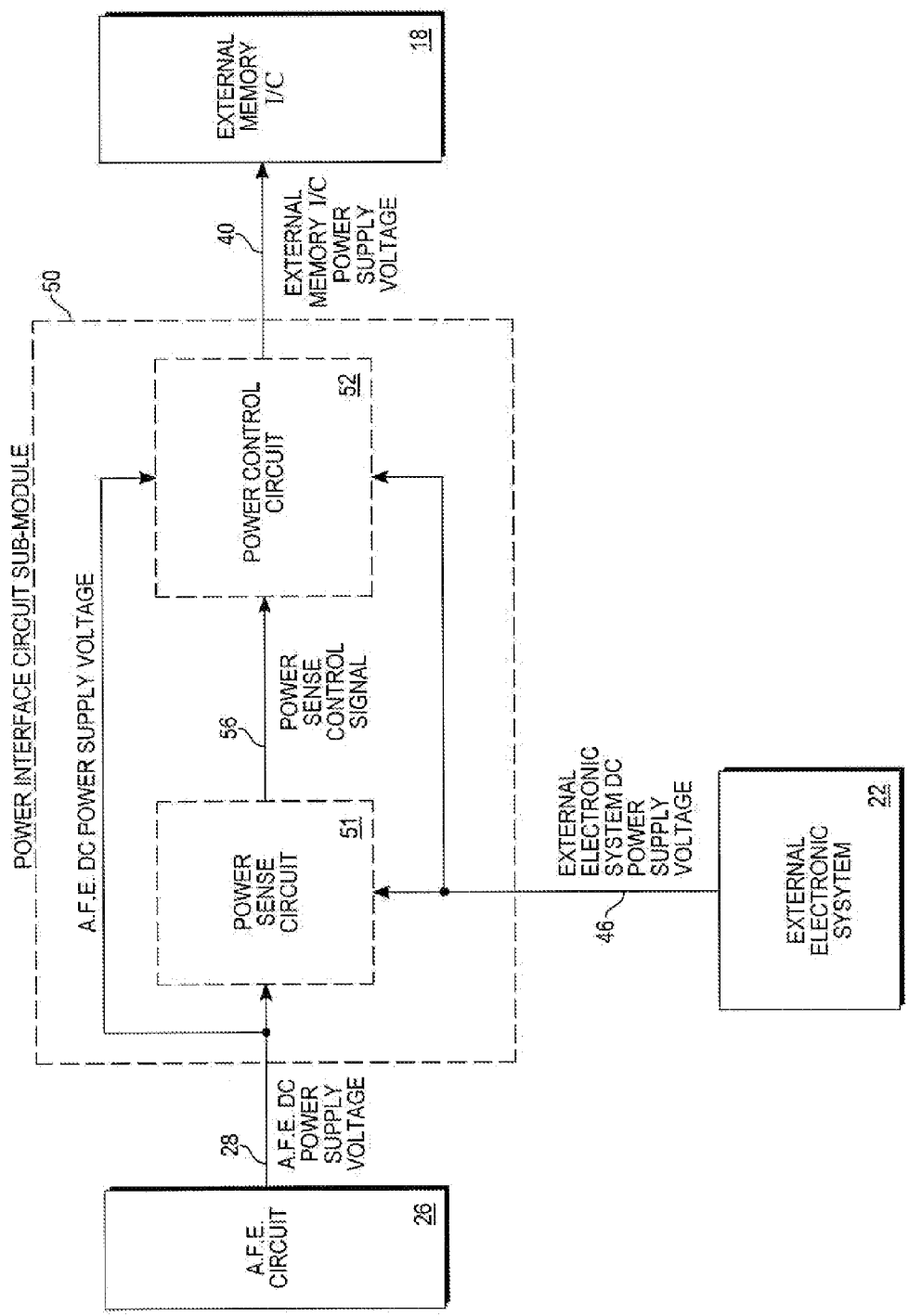
FIG. 2 is a block diagram that shows a power interface circuit sub-module that has a power sensing circuit and a power control circuit.

FIG. 2 shows the analog front-end A.F.E. circuit 26 providing the A.F.E. power supply voltage on the A.F.E. DC power line 28 to a power interface circuit sub-module 50 that is part of the interface circuit module 29 shown in FIG. 1. The A.F.E. power supply voltage is also provided on the A.F.E. DC power line 28 to a power sense circuit 51 and to a power control circuit 52. FIG. 2 also shows the external electronic system 22 providing the external electronic system power supply voltage on the external-electronic system DC power line 46 to the power sense circuit 51 and the power control circuit 52.

The power sense circuit 51 determines if the external electronic system power supply voltage is present on line 46. If so, a power sense control signal on a power sense control signal line 56 causes the power control circuit 52 to select the external electronic system power supply voltage and to provide that voltage on external-electronic-system DC power line 46 to the external memory IC 18. On the other hand, if only the A.F.E DC power supply voltage on the A.F.E. DC power line 28 is present, the power sense control signal on a power sense control signal line 56 causes the power control circuit 52 to select the A.F.E. DC power supply voltage on A.F.E. DC power line 28 and to provide that voltage to the external memory IC 18.

Figure 3:
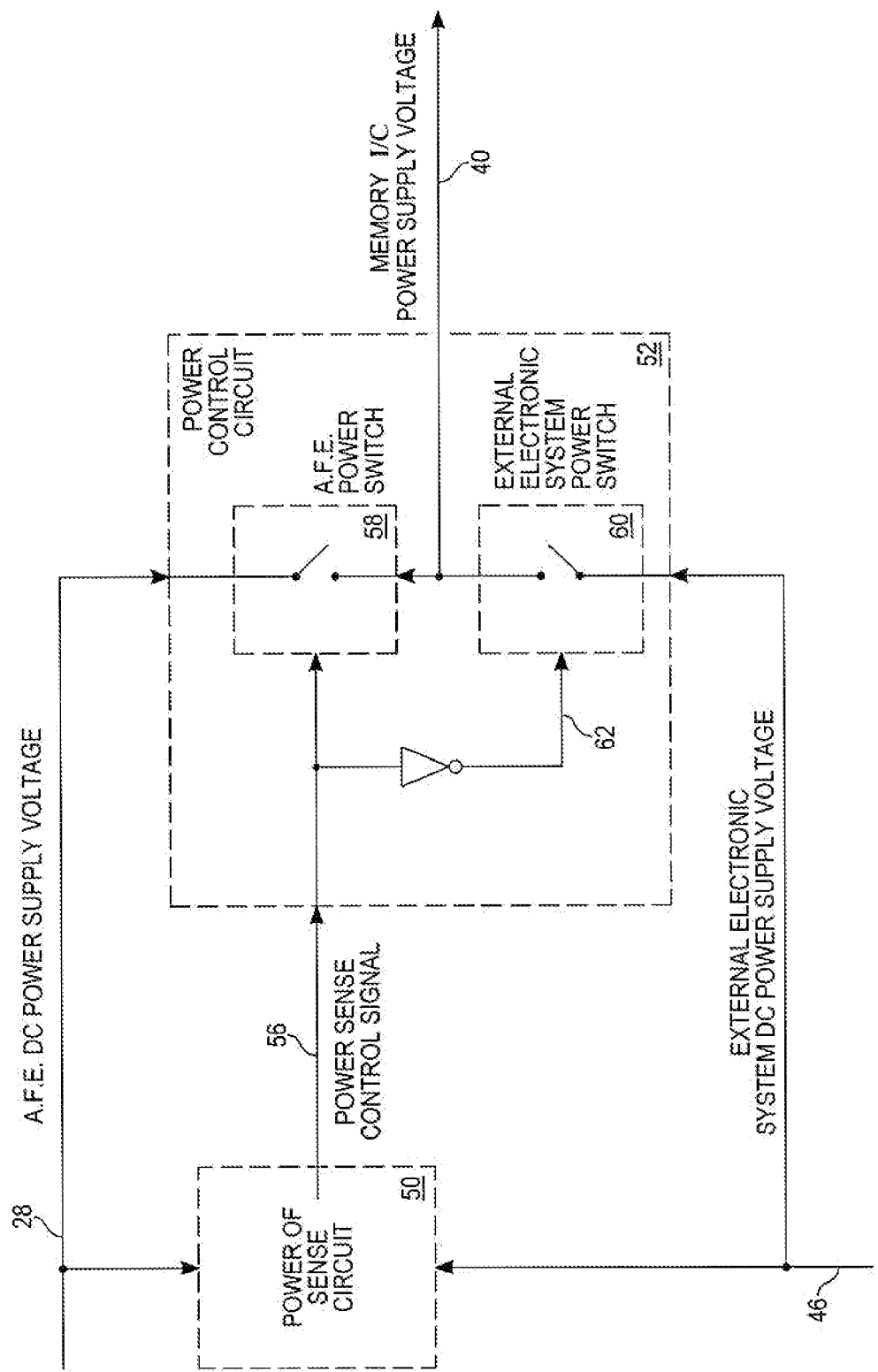
FIG. 3 is a circuit diagram illustrating power switches in the power control circuit of FIG. 2.

FIG. 3 further illustrates operation of the power control circuit 52. The power control circuit 52 includes an A.F.E. power switch device 58 that, when closed by a control signal on line 56, connects the A.F.E. power supply voltage on the A.F.E. DC power line 28 to the memory IC power supply voltage line 40 to provide DC power to the external memory IC 18. The power control circuit 52 also includes an external electronic system power switch device 60 that, when closed by an inverted control signal on line 62, connects the external electronic system power supply voltage on the external-electronic-system DC power line 46 to the memory IC power supply voltage line 40 to provide DC power to the external memory IC 18. Note that the voltage sent on supply line 40 from the external electronic system needs to be regulated.

Figure 4:
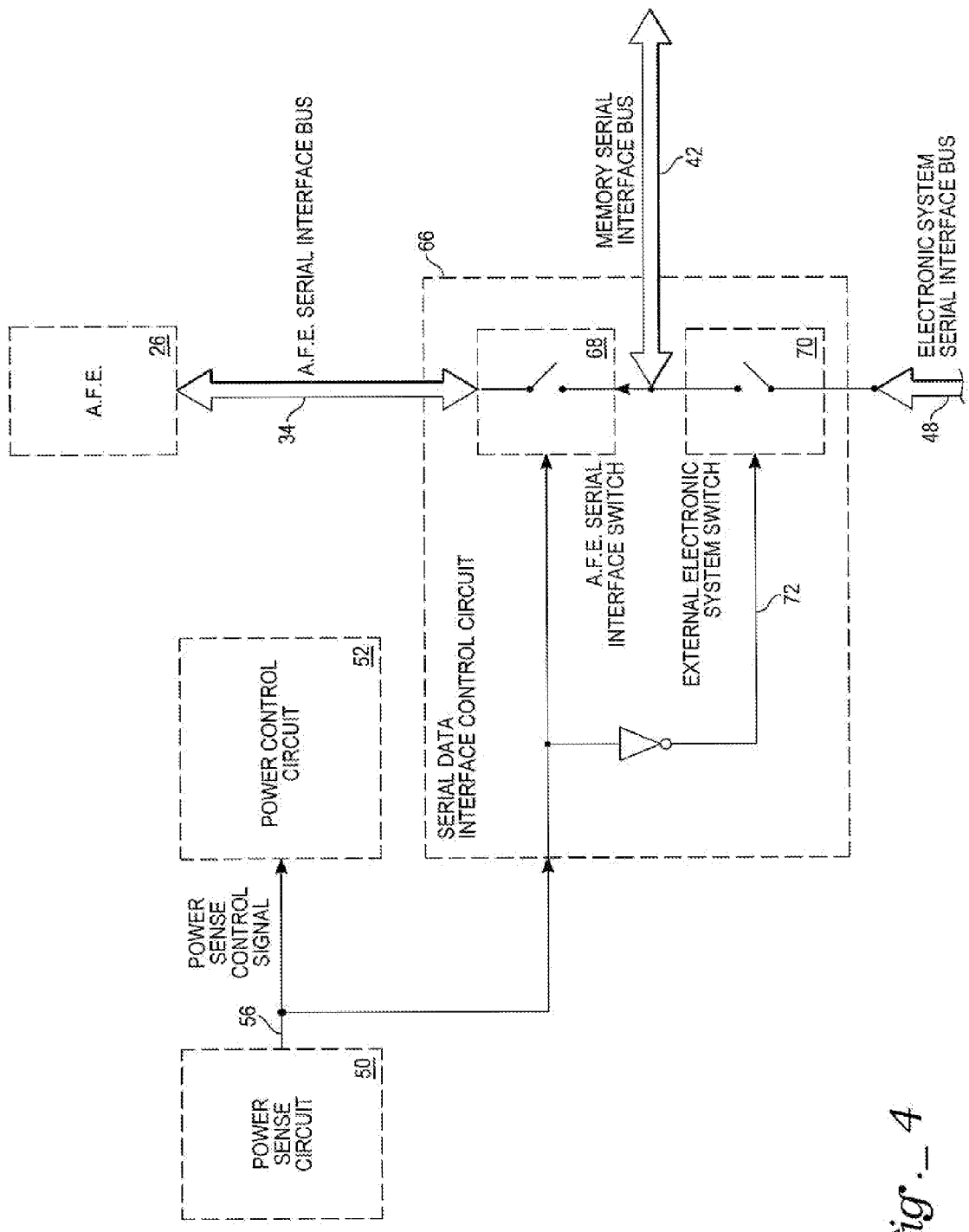
FIG. 4 is a block diagram showing a serial data interface control circuit.

FIG. 4 shows a serial DATA interface control circuit 66 that is part of the interface circuit module 29 of FIG. 1. The serial DATA interface control circuit 66 includes an A.F.E. serial interface switch 68 that, when closed by a control signal on line 56, connects the A.F.E. serial interface bus 34 to the memory serial interface bus 42 to provide data, status, and control signals to and from the external memory IC 18. The serial data interface control circuit 66 also includes an external electronic system switch 70 that, when closed by an inverted control signal on a control line 72, connects the external electronic system serial interface bus 48 to the memory serial interface bus 42 to provide data, status, and control signals to and from the external memory IC 18. The switches 68, 70 are operated to prevent data exchange between the AFE circuit and the external electronic system.

FIGS. 5-8 illustrates other embodiments of the present invention. Like reference characters and similar reference characters are used to represent like and similar components in these other embodiments. These other embodiments include, for example, an auxiliary power sources for the external memory IC that include a battery or a fuel cell. Parallel data exchanges rather than serial data exchanges are also illustrated. It is to be recognized that each one of the serial or parallel data ports could have a different serial or parallel data protocol provided by protocol converter subsystems added to port circuitry, as required. For example, the system ports could be optical, USB, firewire, or any data bus protocol.

Figure 5:
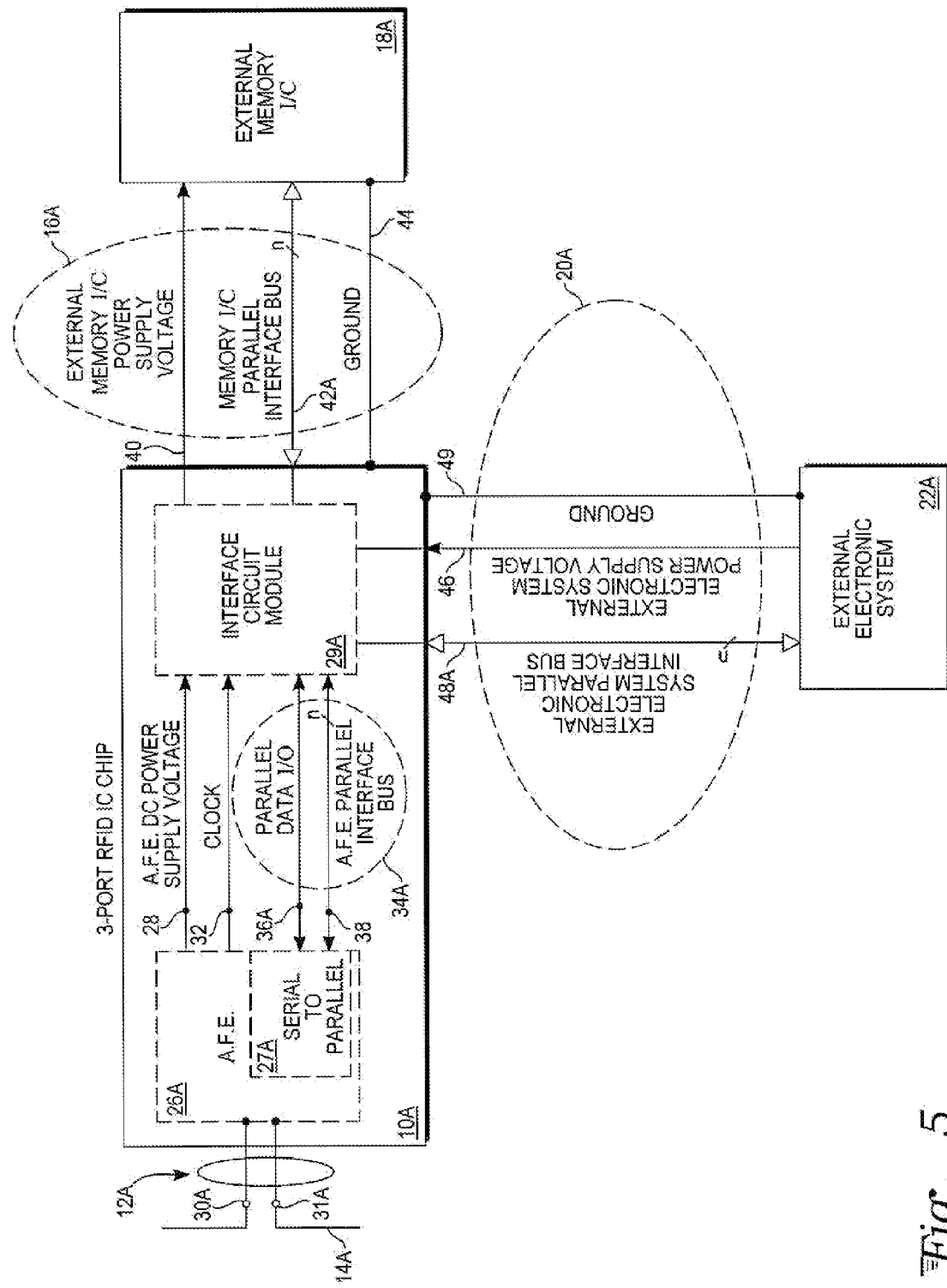
FIG. 5 is a block diagram showing a three-port RFID interface similar to that of FIG. 1 with parallel data.

FIG. 5 shows another embodiment of a three-port RFID interface integrated-circuit chip 10A, according to the present invention, using parallel data transfer. The three-port RFID interface integrated-circuit chip 10A illustrates an interface for three parallel data ports. Note that the present invention also can function with combinations of serial and parallel ports, as required for particular applications. An antenna port 12 provides an interface with an external RF source (not shown) through dipole antenna 14A that is used with UHF RFID devices. As external memory port 16A provides an interface with an external memory IC 18A. An external system port 20A provides an interface with an external electronic system 22A. This allows the external memory IC 18A to be used independently with power provided from one of two power sources. One source is an external RF signal received at the antennas port 12A, without power from the external electronic system 22A. As described herein below, an other source is an auxiliary voltage source, such as, for example, a battery, a fuel cell, etc., that is useful when a UHF RFID signal cannot provide sufficient power to provide a supply voltage to the external memory IC 18A.

The three-port RFID interface integrated-circuit chip 10A includes an analog front-end A.F.E. circuit 26A and an interface circuit 29A. Bi-directional terminals 30A, 31A for the analog front-end A.F.E. circuit 26A are connected to the dipole antenna 14A to receive RF energy from an RF signal provided from an external RF source. The RF signal is modulated, for example, with various types of information, including data information, clock information, status information, and control information. Some of this information can be sent to the external memory IC 18A through the external memory port 16A. Various types of information can also be sent to the antenna 14A through the antenna port 12A to the reader/interrogator.

The A.F.E. circuit 26A is provided as known in the art with a rectifier circuit (not shown) that converts received RF energy to a DC output voltage that is provided on a DC power line 28 to an input terminal of the interface circuit module 29A. As mentioned previously, sufficient power may not be available from, for example, a UHF antenna so that an auxiliary voltage supply needs to be provided. The A.F.E. circuit 26A has a clock recovery circuit that provides a clock signal on a clock line 32 to an input terminal of the interface circuit module 29A.

An A.F.E. parallel interface bus 34A between the A.F.E. circuit 26A and the interface circuits 29A provides input/output parallel data on a parallel DATA I/O signal line 36A. The A.F.E. parallel interface bus 34A also provides a status/control sub-bus 38 having n-lines between the A.F.E. circuit 26A and the interface circuits 29A for carrying status and control signals, as required. Conversion of serial to parallel data streams is implemented in a serial-to-parallel data converter 27A.

The external memory port 16A provides a memory IC power supply voltage on a DC power line 40 to the external memory IC 18A. The external memory port 16A also provides a n-line memory parallel interface bus 42A between the interface circuit module 29A and the external memory IC 18A. A ground line 44 is also provided between the interface circuit module 29A and the external memory IC 18A. The memory parallel interface bus 42A carries parallel data, status, and control signals between the interface circuit module 29A and the external memory IC 18A.

The external electronic system 22A provides an external electronic system power supply voltage on an external-system DC power line 46 of the external system port 20A. The external system port 20A also provides an n-line electronic system parallel interface bus 48A between the external electronic system 22A and the interface circuit module 29A. The n-line electronic system parallel interface bus 48A carries parallel data, status, and control signals between the interface circuit module 29A and the external electronic system.

A ground line 49 is also provided between the external electronic system and the interface circuit module 29A.

Figure 6:
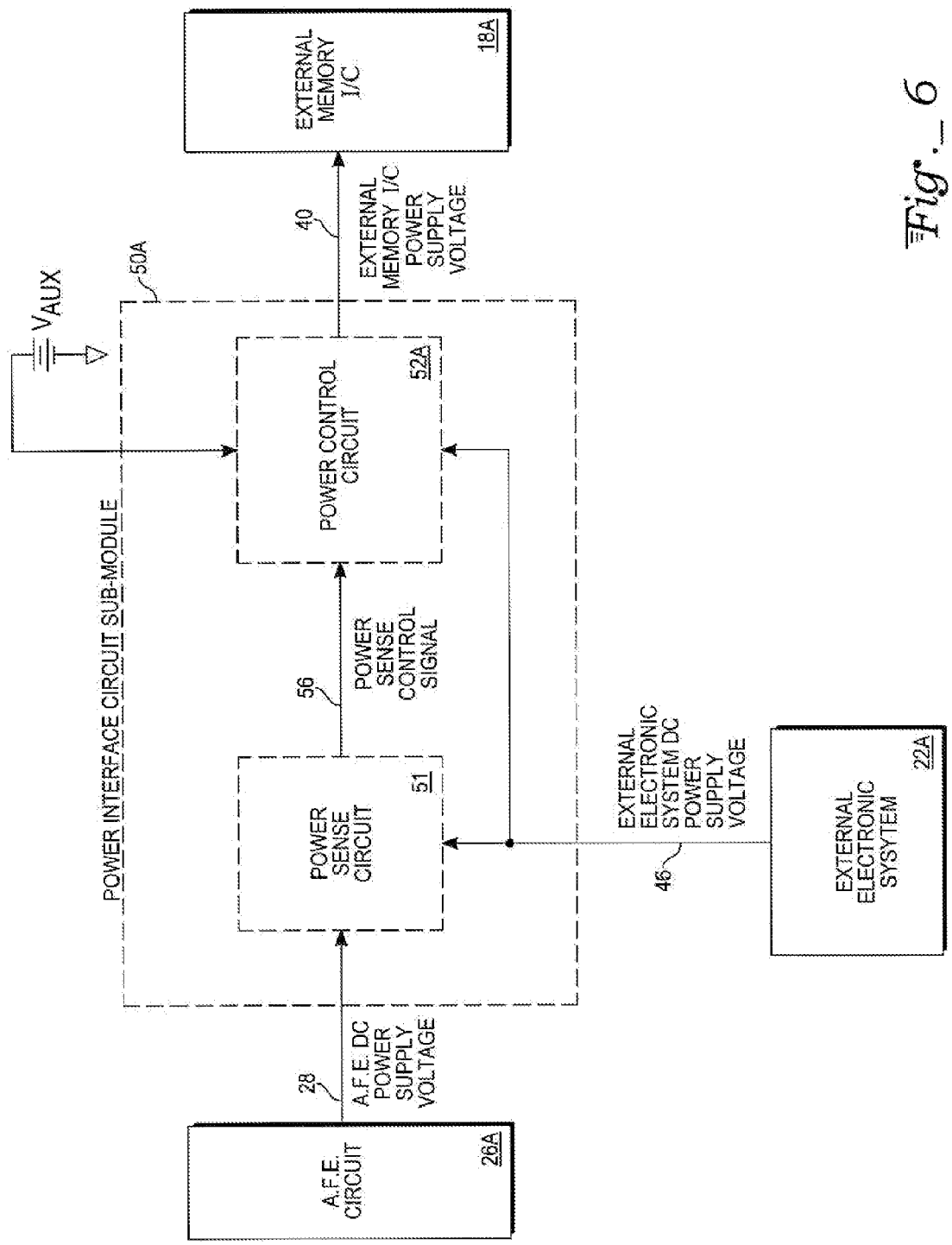
FIG. 6 is a block diagram that shows a power interface circuit sub-module that has a power sensing circuit and a power control circuit that uses an auxiliary voltage source.

FIG. 6 shows the analog front-end A.F.E. circuit 26A providing the A.F.E. power supply voltage on the A.F.E. DC power line 28 to a power interface circuit sub-module 50A that is part of the interface circuit module 29A shown in FIG. 5. An auxiliary voltage source Vaux is provided, for example, from a battery, as indicated, a fuel cell, or other voltage source. The Vaux auxiliary voltage source is provided using a fourth port, or an auxiliary voltage port, having a power and a ground connection.

FIG. 6 also shows the external electronic system 22A providing the external electronic system power supply voltage on the external-electronic-system DC power line 46 to the power sense circuit 51 and the power control circuit 52A. In this arrangement, this auxiliary power source is connected by the power control circuit 52A when AFE power is sensed, but the AFE cannot supply sufficient power from, for example, a UHF RFID signal. Since more power is required to perform write operations in a FLASH memory device than is typically available in an RF field, the Vaux auxiliary voltage source provides sufficient power. Because of various constraints, UHF and microwave RFID devices can recover approximately only one-hundredth of the power in a RF field as compared to recover from a LF or HF RFID device. Consequently, an external auxiliary power source is required.

The power sense circuit 51 determines if the external electronic system power supply voltage is present on line 46. If so, a power sense control signal on a power sense control signal line 56 causes the power control circuit 52A to select the external electronic system power supply voltage and to provide that voltage on external-electronic-system DC power line 46 to the external memory IC 18A. On the other hand, if the AFE supply voltage 28 is present, the power sense control signal on a power sense control signal line 56 causes the power control circuit 52A to select the Vaux supply voltage and to provide that voltage to the external memory IC 18A.

Figure 7:
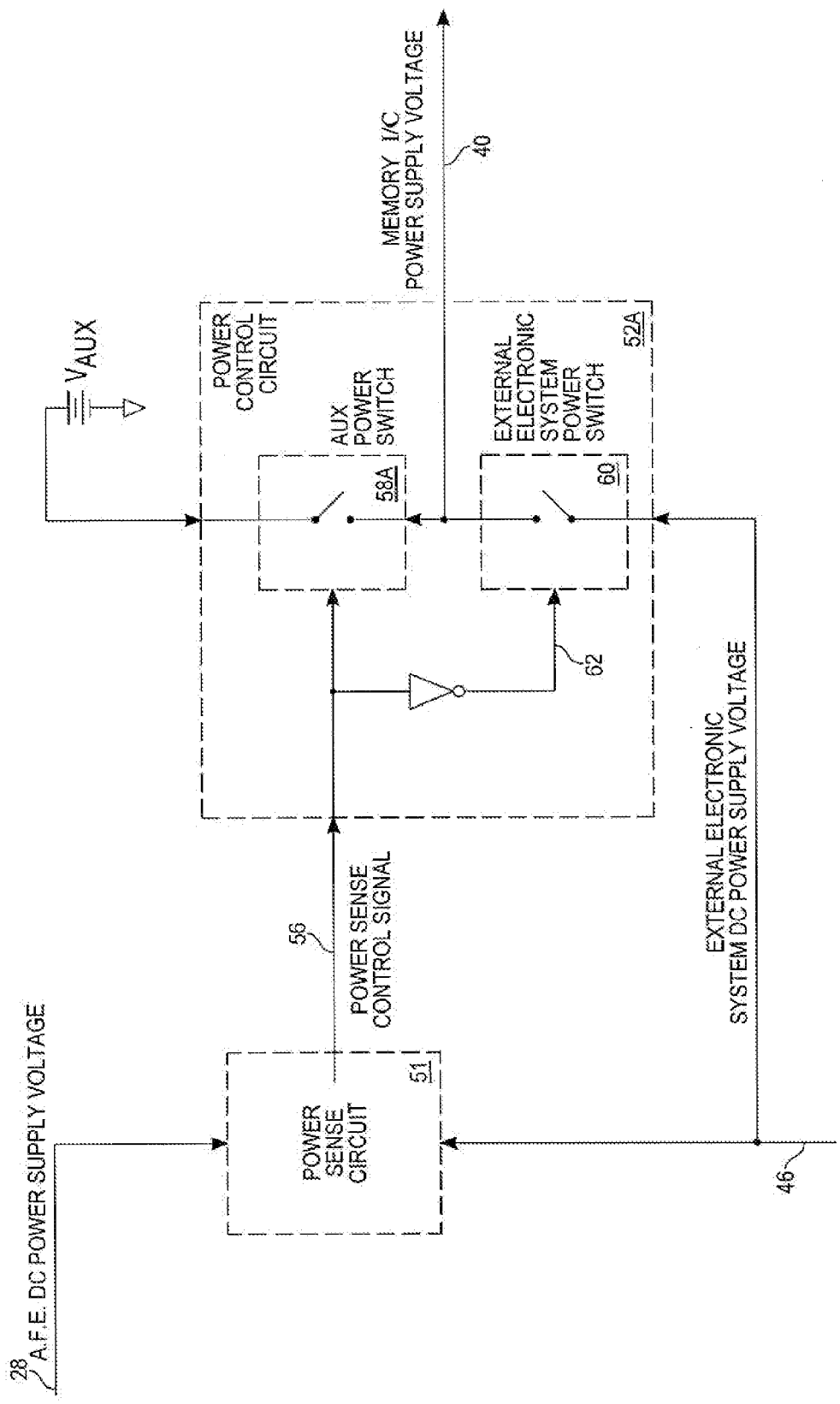
FIG. 7 is a circuit diagram illustrating power switches in the power control circuit of FIG. 6.

FIG. 7 further illustrates operation of the power control circuit 52A. An A.F.E. power switch device 58A, when closed by a control signal on line 56, connects the Vaux supply voltage to the memory IC power supply voltage line 40 to provide DC power to the external memory IC 18A. The power control circuit 52A also includes the external electronic system power switch device 60 that, when closed by an inverted control signal on line 62, connects the external electronic system power supply voltage on the external-electronic-system DC power line 46 to the memory IC power supply voltage line 40 to provide DC power to the external memory IC 18A. Note that the voltage sent on supply line 40 from the external electronic system needs to be regulated.

Figure 8:
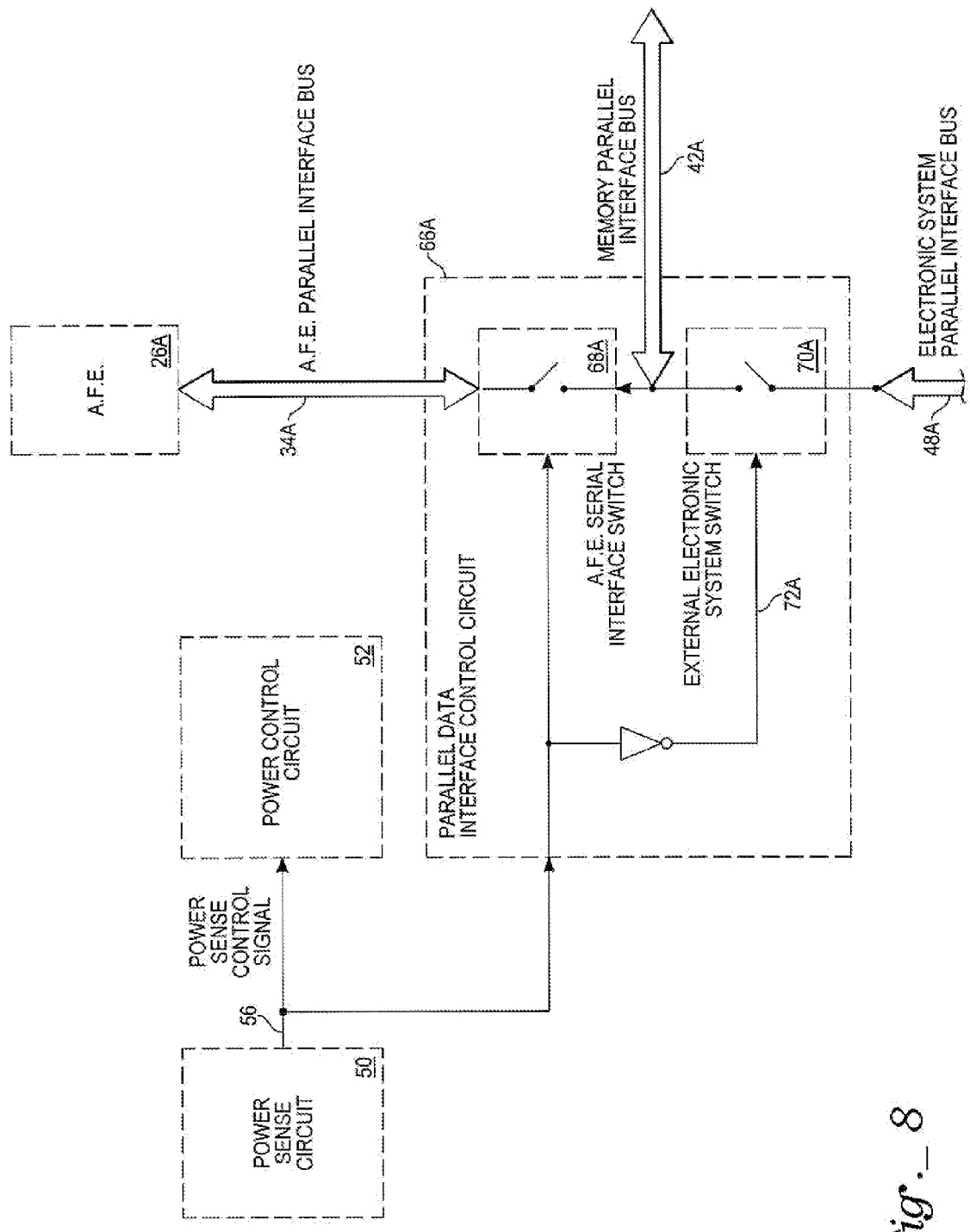
FIG. 8 is a block diagram showing parallel data interface control circuit.

FIG. 8 shows a parallel DATA interface control circuit 66A that is part of the interface circuit module 29A of FIG. 5. The parallel DATA interface control circuit 66A includes an A.F.E. serial interface bus switch 68A that, when closed by a control signal on line 56, connects the A.F.E. parallel interface bus 34A to the memory parallel interface bus 42A to provide parallel data, status, and control signals to and from the external memory IC 18A. The parallel data interface control circuit 66A also includes an external electronic system switch 70A that, when closed by an inverted control signal on a control line 72A, connects the external electronic system parallel interface bus 48A to the memory parallel interface bus 42A to provide parallel data, status, and control signals to and from the external memory IC 18A. The switches 68A, 70A are operated to prevent data exchange between the AFE circuit and the external electronic system.

Applications of the device include, but are not limited to: identification and control of electronic systems, extraction of data logs or records from an electronic system, calibration of an electronic system, configuration of an electronic system, security functions (key exchange, system access level authorization), and diagnostic control. This includes medical devices which may be implanted and otherwise not accessible to the outside world (drug pumps, artificial organs, pacemakers, etc.).

The foregoing description of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A three-port RFID interface integrated-circuit chip, comprising:
    a bi-directional RF first port that is adapted to be coupled to an external source of RF energy;
    an analog front end (AFE) circuit that is coupled to the bi-directional RF first input port, wherein the AFE circuit provides an AFE power supply DC output voltage from a RF signal received from the external source of RF energy, wherein the AFE circuit is coupled to a bi-directional AFE interface bus on which are exchanged data I/O signals and status/control signals;
    an external memory second port through which an external memory integrated circuit is coupled to an interface circuit module;
    wherein the interface circuit module receives the AFE power supply DC output voltage from the AFE circuit, wherein the interface circuit module provides through the external memory second port an external memory integrated circuit power supply voltage to the external memory integrated circuit;
    wherein the interface circuit module is connected to the AFE interface bus; wherein the interface circuit module is coupled to the external memory IC through a bi-directional memory integrated circuit interface bus on which are exchanged data I/O signals and status/control signals;
    a third external electronic system port through which an external electronic system is coupled to the interface circuit module;
    wherein the external electronic system provides an external system power supply voltage to the interface circuit module; and
    wherein the external electronic system is coupled to the interface circuit module through a bi-directional external electronic system interface bus on which are exchanged data I/O signals and status/control signals.

2. The three-port RFID interface integrated-circuit chip of claim 1 wherein the bi-directional AFE interface bus is a serial interface bus on which are exchanged serial data I/O signals and status/control signals.

3. The three-port RFID interface integrated-circuit chip of claim 1 wherein the bi-directional memory integrated circuit interface bus is a serial interface bus on which are exchanged serial data I/O signals and status/control signals.

4. The three-port RFID interface integrated circuit chip of claim 1 wherein the bi-directional external electronic system interface bus is a serial interface bus on which are exchanged serial data I/O signals and status/control signals.

5. The three-port RFID interface integrated-circuit chip of claim 1 wherein the bi-directional AFE interface bus is a parallel interface bus on which are exchanged parallel data I/O signals and status/control signals.

6. The three-port RFID interface integrated-circuit chip of claim 1 wherein the bi-directional memory integrated circuit interface bus is a parallel interface bus on which are exchanged parallel data I/O signals and status/control signals.

7. The three-port RFID interface integrated-circuit chip of claim 1 wherein the bi-directional external electronic system interface bus is a parallel interface bus on which are exchanged parallel data I/O signals and status/control signals.

8. The three-port RFID interface integrated-circuit chip of claim 1 wherein the interface circuit module includes:
   a power sense circuit that has a first input terminal for receiving the AFE power supply DC voltage from the AFE circuit, that has a second input terminal connected to the external electronic system power supply voltage, and that has a power sense control signal output terminal at which is provided a power sense control output signal that has one state which indicates when the external electronic system power supply voltage is present and that has another alternative state that indicates when the AFE power supply DC voltage is present; and
   a power control circuit responsive to the alternative states of the power sense control signal for respectively providing the AFE power supply DC voltage or the external electronic system power supply voltage as the external memory IC power supply voltage to the external memory IC.

9. The three-port RFID interface integrated-circuit chip of claim 8 wherein the power control circuit includes:
   an AFE power switch that is controlled by the power sense control signal to provide through the external memory second port an external memory integrated circuit power supply voltage to the external memory integrated circuit; and
   wherein the power control circuit includes an external electronic system power switch that is controlled by the power sense control signal to alternatively provide through the external memory second port an external memory integrated circuit power supply voltage to the external memory integrated circuit.

10. The three-port RFID interface integrated-circuit chip of claim 1 wherein the interface circuit module includes:
    a power sense circuit that has a first input terminal for receiving the AFE power supply DC voltage from the AFE circuit, that has a second input terminal connected to the external electronic system power supply voltage, and that has a power sense control signal output terminal at which is provided a power sense control output signal that has one state which indicates when the external electronic system power supply voltage is present and that has another alternative state that indicates when the AFE power supply DC voltage is present; and
    a serial data interface control circuit responsive to the alternative states of the power sense circuit for respectively providing connection between the AFE serial interface bus and the memory serial interface IC bus and between electronic system serial interface bus and the memory serial interface bus.

11. The three-port RFID interface integrated-circuit chip of claim 10:
    wherein the serial data interface control circuit has an AFE serial data interface switch that is controlled by the power sense control signal to provide connection between the AFE serial interface bus and the memory serial interface bus; and
    wherein the serial data interface control circuit has an external electronic system switch that is controlled by the power sense control signal to alternatively provide connection between the electronic system serial interface bus and the memory serial interface bus.

12. The three-port RFID interface integrated-circuit chip of claim 1 including an additional port which is coupled to the interface circuit and at which is provided an auxiliary DC power supply voltage that replaces the AFE power supply DC output voltage.

13. A three-port RFID interface integrated-circuit chip, comprising:
    a bi-directional RF first port that is adapted to be coupled to an external source of RF energy;
    an analog front end (AFE) circuit that is coupled to the bi-directional RF first input port, wherein the AFE circuit provides an AFE power supply DC output voltage from a RF signal received from the external source of RF energy, wherein the AFE circuit is coupled to a bi-directional AFE serial interface bus on which are exchanged serial data I/O signals and status/control signals;
    an external memory second port through which an external memory integrated circuit is coupled to an interface circuit module;
    wherein the interface circuit module receives the AFE power supply DC output voltage from the AFE circuit, wherein the interface circuit module provides through the external memory second port an external memory integrated circuit power supply voltage to the external memory integrated circuit;
    wherein the interface circuit module is connected to the AFE serial interface bus, wherein the interface circuit module is coupled to the external memory IC through a bi-directional memory integrated circuit serial interface bus on which are exchanged serial data I/O signals and status/control signals;
    a third external electronic system port through which an external electronic system is coupled to the interface circuit module;
    wherein the external electronic system provides an external system power supply voltage to the interface circuit module;
    wherein the external electronic system is coupled to the interface circuit module through a bi-directional external electronic system serial interface bus on which are exchanged serial data I/O signals and status/control signals;
    a power sense circuit that has a first input terminal for receiving the AFE power supply DC voltage from the AFE circuit, that has a second input terminal connected to the external electronic system power supply voltage, and that has a power sense control signal output terminal at which is provided a power sense control output signal that has one state which indicates when the external electronic system power supply voltage is present and that has another alternative state that indicates when the AFE power supply DC voltage is present;
    a power control circuit responsive to the alternative states of the power sense control signal for respectively providing the AFE power supply DC voltage or the external electronic system power supply voltage as the external memory IC power supply voltage to the external memory IC; and
    a serial data interface control circuit responsive to the alternative states of the power sense circuit for respectively providing connection between the AFE serial interface bus and the memory serial interface IC bus and between electronic system serial interface bus and the memory serial interface bus.

14. The three-port RFID interface integrated-circuit chip of claim 13 including an additional port which is coupled to the interface circuit and at which is provided an auxiliary DC power supply voltage that replaces the AFE power supply DC output voltage.

15. The three-port RFID interface integrated-circuit chip of claim 13:
wherein the power control circuit includes an AFE power switch that is controlled by the power sense control signal to provide through the external memory second port an external memory integrated circuit power supply voltage to the external memory integrated circuit; and
wherein the power control circuit includes an external electronic system power switch that is controlled by the power sense control signal to alternatively provide through the external memory second port an external memory integrated circuit power supply voltage to the external memory integrated circuit.

16. The three-port RFID interface integrated-circuit chip of claim 13:
wherein the serial data interface control circuit has an AFE serial data interface switch that is controlled by the power sense control signal to provide connection between the AFE serial interface bus and the memory serial interface bus; and
wherein the serial data interface control circuit has an external electronic system switch that is controlled by the power sense control signal to alternatively provide connection between the electronic system serial interface bus and the memory serial interface bus.

17. A method of interfacing three ports through a three-port RFID chip, comprising the steps of:
coupling a bi-directional RF first port to an external source of RF energy;
coupling an analog front end (AFE) to the bi-directional RF first input port;
receiving a RF signal from the external source of RF energy and providing with the AFE circuit an AFE power supply DC output voltage;
coupling the AFE circuit to a bi-directional AFE interface bus on which are exchanged serial data I/O signals and status/control signals;
coupling through an external memory second port an external memory integrated circuit that is coupled to an interface circuit module;
receiving with the interface circuit module the AFE power supply DC output voltage from the AFE circuit;
providing with the interface circuit module and through the external memory second port to the external memory integrated circuit an external memory integrated circuit power supply voltage;
connecting the interface circuit module to the AFE interface bus;
coupling the interface circuit module to the external memory IC through a bi-directional memory integrated circuit interface bus on which are exchanged data I/O signals and status/control signals;
coupling through a third external electronic system port to the interface circuit module an external electronic system;
providing with the external electronic system an external system power supply voltage to the interface circuit module; and
coupling the external electronic system to the interface circuit module through a bi-directional external electronic system interface bus on which are exchanged data I/O signals and status/control signals.

18. The method of claim 17, wherein the step of coupling the AFE circuit to a bi-directional AFE interface bus includes coupling the AFE circuit to a bi-directional AFE serial interface bus on which are exchanged serial data I/O signals and status/control signals.

19. The method of claim 17, wherein the step of coupling the interface circuit module to the external memory IC through a bi-directional memory integrated circuit interface bus includes coupling the interface circuit module to the external memory IC through a bi-directional memory integrated circuit serial interface bus on which are exchanged serial data I/O signals and status/control signals.

20. The method of claim 17, wherein the step of coupling the external electronic system to the interface circuit module through a bi-directional external electronic system interface bus includes coupling the external electronic system to the interface circuit module through a bi-directional external electronic system serial interface bus on which are exchanged serial data I/O signals and status/control signals.

21. The method of claim 17, wherein the step of coupling the AFE circuit to a bi-directional AFE interface bus includes coupling the AFE circuit to a bi-directional AFE parallel interface bus on which are exchanged parallel data I/O signals and status/control signals.

22. The method of claim 17, wherein the step of coupling the interface circuit module to the external memory IC through a bi-directional memory integrated circuit interface bus includes coupling the interface circuit module to the external memory IC through a bi-directional memory integrated circuit parallel interface bus on which are exchanged parallel data I/O signals and status/control signals.

23. The method of claim 17, wherein the step of coupling the external electronic system to the interface circuit module through a bi-directional external electronic system interface bus includes coupling the external electronic system to the interface circuit module through a bi-directional external electronic system parallel interface bus on which are exchanged parallel data I/O signals and status/control signals.

24. The method of claim 23, including:
receiving at a first input terminal of a power sense circuit in the interface circuit the AFE power supply DC voltage from the AFE circuit;
connecting a second input terminal of the power sense circuit in the interface circuit the external electronic system power supply voltage;
providing at a power sense control signal input terminal a power sense control output signal that has one state which indicates when the external electronic system power supply voltage is present and that has another alternative state that indicates when the AFE power supply DC voltage is present; and
respectively providing, with a data interface control circuit responsive to the alternative states of the power sense circuit, connection between the memory serial interface bus and the AFE interface bus or the memory serial interface IC bus.

25. The method of claim 17, including:
receiving at a first input terminal of a power sense circuit in the interface circuit the AFE power supply DC voltage from the AFE circuit;
connecting a second input terminal of the power sense circuit in the interface circuit the external electronic system power supply voltage;

providing at a power sense control signal input terminal a power sense control output signal that has one state which indicates when the external electronic system power supply voltage is present and that has another alternative state that indicates when the AFE power supply DC voltage is present; and respectively providing, with a power control circuit responsive to the alternative states of the power sense control signal, the AFE power supply DC voltage or the external electronic system power supply voltage as the external memory IC power supply voltage to the external memory IC.

26. The method of claim 17, including:

controlling an AFE power switch in the power control circuit with the power sense control signal and providing through the external memory second port an external memory integrated circuit power supply voltage to the external memory integrated circuit; and controlling an external electronic system power switch in the power control circuit with the power sense control signal for alternatively providing through the external memory second port an external memory integrated circuit power supply voltage to the external memory integrated circuit.

27. The method of claim 24, including:

controlling an AFE serial data interface switch in the serial data interface control circuit with the power sense control signal for providing connection between the AFE interface bus and the memory interface bus; and controlling an external electronic system switch in the serial data interface control circuit for alternatively providing connection between the electronic system interface bus and the memory interface bus.

28. The method of claim 17 including replacing the AFE power supply DC output voltage with an auxiliary DC power supply voltage.

* * * * *